US011115321B2

(12) United States Patent
Kim

(10) Patent No.: US 11,115,321 B2
(45) Date of Patent: Sep. 7, 2021

(54) DYNAMIC ROUTING APPARATUS AND METHOD FOR CAN MESSAGE OF VEHICLE

(71) Applicant: HYUNDAI AUTRON CO., LTD., Seongnam-si (KR)

(72) Inventor: Kyung-Tae Kim, Anyang-si (KR)

(73) Assignee: HYUNDAI AUTRON CO., LTD., Seongnam-si (KR)

( * ) Notice: Subject to any disclaimer, the term of this patent is extended or adjusted under 35 U.S.C. 154(b) by 159 days.

(21) Appl. No.: 16/208,436

(22) Filed: Dec. 3, 2018

(65) Prior Publication Data
US 2019/0182150 A1    Jun. 13, 2019

(30) Foreign Application Priority Data
Dec. 8, 2017   (KR) .......................... 10-2017-0167904

(51) Int. Cl.
*H04L 12/721*   (2013.01)
*H04L 12/40*    (2006.01)
(Continued)

(52) U.S. Cl.
CPC .............. *H04L 45/38* (2013.01); *H04L 12/40* (2013.01); *H04L 12/40006* (2013.01);
(Continued)

(58) Field of Classification Search
CPC ..... H04L 45/745; H04L 47/20; H04L 47/283; H04L 49/351; H04L 51/36;
(Continued)

(56) References Cited

U.S. PATENT DOCUMENTS 6,600,743 B1 *   7/2003   Lee ..................... H04L 12/1836
                                                          370/390
7,787,450 B1 *   8/2010   Chan .................... H04L 45/028
                                                          370/389
(Continued)

FOREIGN PATENT DOCUMENTS

CN         1838011 A      9/2006
CN       103023786 A      4/2013
(Continued)

*Primary Examiner* — Joseph A Bednash
(74) *Attorney, Agent, or Firm* — Morgan, Lewis & Bockius LLP

(57) ABSTRACT

A dynamic routing device for a CAN message of a vehicle includes: a message reception unit configured to receive a message of a specific ID transmitted from a source controller and a designated specific message from at least one destination controller; a message reception filter configured to dynamically change based on at least one piece of information included in the specific message; and a gateway controller including the message reception unit and the message reception filter, wherein the gateway controller is configured to generate dynamic routing table information based on information about the specific message, check reception of a message with respect to only a message ID set to the message reception filter, and perform message routing on a destination controller designated in the dynamic routing table.

15 Claims, 6 Drawing Sheets

(51) Int. Cl.
*H04L 12/755* (2013.01)
*H04L 12/741* (2013.01)
*H04L 12/46* (2006.01)

(52) U.S. Cl.
CPC ........ *H04L 12/4625* (2013.01); *H04L 45/021* (2013.01); *H04L 45/34* (2013.01); *H04L 45/54* (2013.01); *H04L 45/745* (2013.01); *H04L 2012/40215* (2013.01); *H04L 2012/40273* (2013.01)

(58) Field of Classification Search
CPC ............. H04L 61/1505; H04L 61/2007; H04L 61/2069; H04L 63/0209; H04L 63/0236; H04L 63/0254; H04L 63/0442; H04L 63/0464; H04L 63/064; H04L 63/0823; H04L 63/0876; H04L 63/10; H04L 63/102; H04L 63/12; H04L 63/1433; H04L 63/164; H04L 65/1006; H04L 65/1016; H04L 65/1073; H04L 65/80; H04L 67/104; H04L 67/1046; H04L 67/1093; H04L 67/141; H04L 67/2809; H04L 67/2819; H04L 67/42; H04L 69/12; H04L 69/14; H04L 69/16; H04L 69/26; H04L 69/321; H04L 69/325; H04L 7/0008; H04L 9/06; H04L 9/0618; H04L 9/0631; H04L 9/065; H04L 9/0662; H04L 9/0822; H04L 9/0825; H04L 9/083; H04L 9/0841; H04L 9/0847; H04L 9/0869; H04L 9/0872; H04L 9/088; H04L 9/0891; H04L 9/12; H04L 9/32; H04L 9/3234; H04L 9/3239; H04L 9/3268; H04L 9/3278

See application file for complete search history.

(56) References Cited

U.S. PATENT DOCUMENTS

| | | | |
|---|---|---|---|
| 8,599,858 B1* | 12/2013 | Mizrahi | H04L 45/20 370/395.31 |
| 2004/0081079 A1* | 4/2004 | Forest | H04J 3/0652 370/216 |
| 2014/0380001 A1* | 12/2014 | Schubert | G06F 21/554 711/153 |
| 2019/0238586 A1* | 8/2019 | Hong | H04L 63/1416 |

FOREIGN PATENT DOCUMENTS

| | | |
|---|---|---|
| CN | 105791119 A | 7/2016 |
| CN | 105898815 A | 8/2016 |
| CN | 105917339 A | 8/2016 |
| CN | 106658632 A | 5/2017 |
| JP | 2006-319759 A | 11/2006 |
| KR | 10-2015-0000306 A | 1/2015 |
| KR | 10-1608356 B1 | 4/2016 |

* cited by examiner

FIG.4

| Cmd (Add or Remove) | Message Count | Message ID Arrays |
|---|---|---|
|  |  |  |

FIG.5

| Message ID | Source Count | Destination Count | ROUTING EXECUTION OR NON-EXECUTION | DESCRIPTION |
|---|---|---|---|---|
| 0x101 | 0 | 1 | No | DESTINATION CONTROLLER DOES NOT REQUEST MESSAGE ROUTING |
| 0x304 | 1 | 0 | No | DESTINATION CONTROLLER REQUESTS MESSAGE ROUTING, BUT ENTERS SLEEP STATE |
| 0x405 | 3 | 2 | Yes | DESTINATION CONTROLLER REQUESTS MESSAGE ROUTING |
| 0x733 | 0 | 0 | No | DESTINATION CONTROLLER DOES NOT REQUEST MESSAGE ROUTING AND ENTERS SLEEP STATE |

DYNAMIC ROUTING APPARATUS AND METHOD FOR CAN MESSAGE OF VEHICLE

CROSS-REFERENCES TO RELATED APPLICATIONS

The present application claims priority to Korean application number 10-2017-0167904, filed on Dec. 8, 2017, which is incorporated by reference in its entirety.

BACKGROUND OF THE INVENTION

The present invention relates to a dynamic routing apparatus and method for a CAN (Controller Area Network) message of a vehicle, and more particularly, to a dynamic routing apparatus and method for a CAN message of a vehicle, capable of actively performing message routing by grasping a state change of a source controller and a destination controller during a vehicle operation based on dynamic routing table information.

Generally, various electronic devices for vehicle driving and various kinds of convenience are provided inside the vehicle. Recently, in electronic devices inside the vehicle, devices for sharing information of various devices so as to maximize user convenience and maintain stability have been increased.

The amount of data used by the electronic devices for the vehicle is continuously increasing, and as data becomes more and more diverse, a data processing method becomes an important issue.

On the other hand, as the number of communication controllers mounted on the vehicle increases, all controllers cannot be connected to a single CAN communication network. Hence, the communication controllers constitute individual CAN networks according to the domains (that is, network) to which the communication controllers belong. In order to perform communication between communication controllers belonging to different domains, there is a need for a gateway controller for transmitting and receiving (that is, message routing) messages (that is, a CAN message, hereinafter simply referred to as a message) between different CAN physical channels.

As illustrated in FIG. 1, a gateway controller 200 performs message routing based on a routing database 100. That is, a routing table is created based on a routing database 100, and a source controller and a destination controller are predefined for each message. Therefore, when a message (that is, a CAN message) is received from the source controller through a message reception unit 210, the gateway controller transmits the message (that is, the CAN message) to the destination controller (or a channel to which the destination controller belongs) through a message transmission unit 220.

However, as the number of communication controllers (hereinafter, a communication controller on a message transmitting side is referred to as a source controller, and a communication controller on a message receiving side is referred to as a destination controller) increases, the number of communication channels managed by the gateway controller is also increasing. Therefore, the load of the bus for each channel and the load of the gateway controller itself are also increasing.

Therefore, when a communication environment is changed during operation, a current routing method (that is, a static message routing method based on a routing database) has a problem that efficiency is lowered. Furthermore, the current routing method has a problem that it is difficult to cope with a dynamic network environment change based on Ethernet and partial network.

The background art of the present invention is disclosed in Korean Patent Registration No. 10-1608356 (registered on Mar. 28, 2016) entitled "Gateway Communication Device and Method).

BRIEF SUMMARY

Embodiments of the present invention are directed to a dynamic routing device and method for a CAN message of a vehicle, which can actively perform message routing by grasping a state change of a source controller and a destination controller based on dynamic routing table information during the operation of the vehicle.

In one embodiment, a dynamic routing device for a CAN message of a vehicle may include: a message reception unit configured to receive a message of a specific ID transmitted from a source controller and a designated specific message from at least one destination controller; a message reception filter configured to dynamically change based on at least one piece of information included in the specific message; and a gateway controller including the message reception unit and the message reception filter, wherein the gateway controller is configured to generate dynamic routing table information based on information about the specific message, check reception of a message with respect to only a message ID set to the message reception filter, and perform message routing on a destination controller designated in the dynamic routing table.

The gateway controller may be configured to dynamically change a setting for message routing according to a routing request of a destination controller and a current state of the destination controller.

The designated specific message received from the destination controller may include: a first specific message in which the destination controller requests or does not request the gateway controller for routing with respect to the specific ID; and a second specific message periodically transmitted to the gateway controller while the destination controller is in an operating state.

The first specific message may include: a command region for recording an add or remove command; a message count region for recording a count to be increased or decreased; and a message ID region for recording a message ID desiring a routing request or a routing non-request.

The gateway controller may be configured to: determine that the destination controller is in an operating state while the second specific message is periodically received; and determine that the destination controller enters a sleep state when the second specific message is not received.

The dynamic routing table may include: message ID information requesting or not requesting routing; source count information about the message ID; destination count information about the message ID; and routing execution or non-execution information about the message ID.

The gateway controller may be configured to: when the first specific message includes an add command, increase a source count of the message ID by 1 in the dynamic routing table; and when the first specific message includes a remove command, decrease the source count of the message ID by 1 in the dynamic routing table.

The gateway controller may be configured to: when the source count of the message ID is changed from 0 to 1, add the message ID to the message reception filter so that the gateway controller performs routing with respect to the message ID; and when the source count of the message ID is changed from 1 to 0, remove the message ID from the message reception filter so that the gateway controller does not perform routing with respect to the message ID.

The gateway controller may be configured to: when a second specific message is received, increase a destination count by 1 with respect to the message ID corresponding to the destination controller in the dynamic routing table, and maintain the destination count; and when the second specific message is not received and timeout occurs, decrease the destination count by 1 with respect to the message ID corresponding to the destination controller.

When the destination count of the message ID is changed from 1 to 0 through the increase or decrease of the destination count, the gateway controller may be configured to determine that the destination controller enters a sleep state and does not perform routing with respect to the destination controller corresponding to the message ID.

In another embodiment, a dynamic routing method for a CAN message of a vehicle may include: receiving, by a gateway controller, a first specific message from a destination controller; checking, by the gateway controller, whether a command included in the first specific message is an add command; when the command included in the first specific message is the add command, reading, by the gateway controller, a message ID included in the first specific message and increasing a source count of the message ID of a dynamic routing table; checking, by the gateway controller, whether the source count of the message D of the dynamic routing table is 1 or more; when the source count of the message ID is 1 or more, adding, by the gateway controller, the message ID to a message reception filter; and checking, by the gateway controller, whether a message is received with respect to only the message ID added to the message reception filter and performing routing on a destination controller.

When the source count of the message ID of the dynamic routing table is increased, the dynamic routing method may further include checking, by the gateway controller, whether the message ID is a message ID present in a routing database after reading the message ID included in the first specific message, and when the message ID is present in the routing database, the source count of the message ID of the dynamic routing table may be increased by 1.

The dynamic routing table may include: message ID information requesting or not requesting routing; source count information about the message ID; destination count information about the message ID; and routing execution or non-execution information about the message ID.

The first specific message may be a message including information in which the destination controller requests or does not request the gateway controller for routing with respect to the specific ID, and the first specific message may include: a command region for recording an add or remove command; a message count region for recording a count to be increased or decreased; and a message ID region for recording a message ID desiring a routing request or a routing non-request.

In another embodiment, a dynamic routing method for a CAN message of a vehicle may include: receiving, by a gateway controller, a first specific message from a destination controller; checking, by the gateway controller, whether a command included in the first specific message is a remove command; when the command included in the first specific message is the remove command, reading, by the gateway controller, a message ID included in the first specific message and decreasing a source count of the message ID of a dynamic routing table when the source count of the message ID of the dynamic routing table is not 0; removing, by the gateway controller, the message ID from a message reception filter when the source count of the message ID of the dynamic routing table is 0 as a result of decreasing the source count of the message ID by 1; and not checking, by the gateway controller, whether a message is received from a source controller with respect to only the message ID removed from the message reception filter.

The dynamic routing table may include: message ID information requesting or not requesting routing; source count information about the message ID; destination count information about the message ID; and routing execution or non-execution information about the message ID.

The first specific message may be a message including information in which the destination controller requests or does not request the gateway controller for routing with respect to the specific ID, and the first specific message may include: a command region for recording an add or remove command; a message count region for recording a count to be increased or decreased; and a message ID region for recording a message ID desiring a routing request or a routing non-request.

BRIEF DESCRIPTION OF THE DRAWINGS

FIG. 4 is a schematic diagram for describing a configuration of a request message or a routing message that a destination controller transmits to a gateway controller in FIG. 2.

FIG. 5 is an exemplary diagram for describing a configuration of dynamic routing table information generated by a gateway controller in FIG. 2.

DETAILED DESCRIPTION

Hereinafter, a dynamic routing device and method for a CAN message of a vehicle in accordance with embodiments of the present invention will be described with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
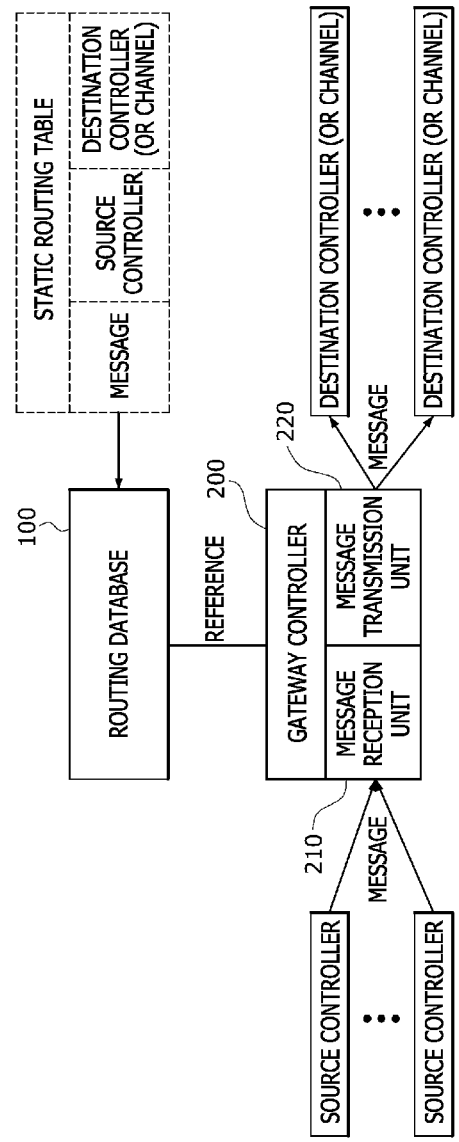
FIG. 1 is an exemplary diagram for describing an operation of a dynamic routing device for a CAN message of a vehicle according to the related art.
Figure 2:
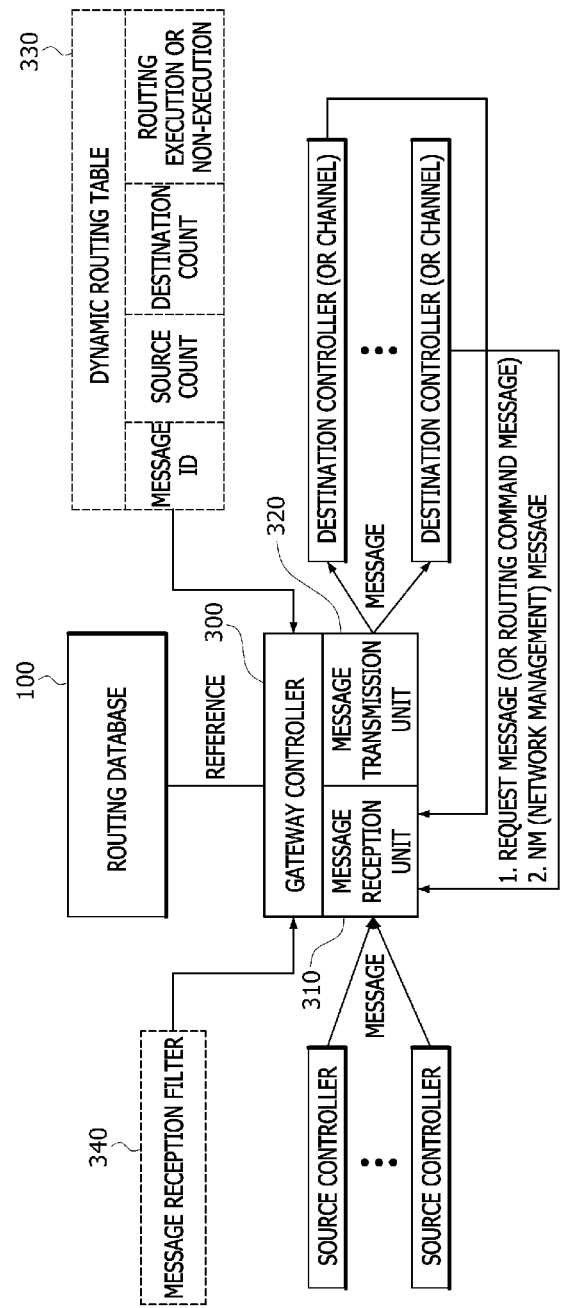
FIG. 2 is an exemplary diagram illustrating a schematic configuration of a dynamic routing device for a CAN message of a vehicle in accordance with an embodiment of the present invention.

FIG. 2 is an exemplary diagram illustrating a schematic configuration of a dynamic routing device for a CAN message of a vehicle in accordance with an embodiment of the present invention.

As illustrated in FIG. 2, the dynamic routing device for the CAN message of the vehicle in accordance with the embodiment of the present invention may include a routing database 100 and a gateway controller 300. The routing database 100 may provide static routing table information. The gateway controller 300 may receive a designated specific message (1. request message (or routing message), 2. Network management (NM) message) from at least one destination controller through a message reception unit 310, generate dynamic routing table information, dynamically change a message reception filter 340 based on at least one piece of information included in the specific message, check reception of a message (that is, a CAN message, hereinafter simply referred to as a message) with respect to only a message ID set to the message reception filter 340, and perform message routing on the destination controller designated in the dynamic routing table.

In the present embodiment, the gateway controller 300 may basically operate based on the dynamic routing table information of the routing database 100.

In the dynamic routing table information, a controller which transmits a message (that is, a source controller) and a controller which receives the message (that is, a destination controller) may be defined for each physical channel. Therefore, when power is supplied to the vehicle and the system starts, the gateway controller 300 may read the information (that is, the dynamic routing table information) and perform a setting for message routing. For example, the gateway controller 300 may read IDs of messages to be read, set a reception filter, and set a transmission period and a physical channel to transmit the message.

However, the present embodiment provides a method for dynamically performing (changing) the setting for message routing according to the current environment, lowering the load (routing load) of the CAN bus and the gateway controller 300, and improving the functional efficiency of the gateway controller 300.

More specifically, the gateway controller 300 may receive a designated specific message (1. request message (or routing message), 2. NM message) from at least one destination controller through the message reception unit 310 and generate the dynamic routing table information.

That is, when a message of a specific ID (that is, a message corresponding to a specific ID) is received or the reception is stopped, at least one destination controller in accordance with the embodiment may transmit a designated first specific message (for example, request message (or routing message)) to the message reception unit 310 of the gateway controller 300 (see FIG. 4).

FIG. 4 is an exemplary diagram for describing the configuration of the request message (or the routing message) that the destination controller transmits to the gateway controller in FIG. 2. As illustrated in FIG. 4, the request message (or the routing message) that the destination controller transmits to the gateway controller 300 may include a command region (that is, a region for recording a command instructing add or remove), a message count region (that is, a region for recording a count to be increased or decreased), and a message ID region (or a message ID arrays region) (that is, a region for recording a message ID requiring a routing request or a routing non-request).

In addition, the gateway controller 300 may receive a designated second specific message (for example, NM message) from at least one destination controller through the message reception unit 310 and generate the dynamic routing table information.

The second specific message (NM message) is a message periodically transmitted while one destination controller is in an operating state (that is, an operating state other than a sleep state). While the second specific message (that is, NM message) is received, the gateway controller 300 may determine that the destination controller is in an operating state. When the second specific message (that is, NM message) is not received, the gateway controller 300 may determine that the destination controller is in a sleep state. In other words, when the communication is started, each of the destination controllers may periodically transmit the second specific message (that is, NM message) to the gateway controller 300, the gateway controller 300 may receive the second specific message (that is, NM message). It is possible to confirm whether the gateway controller 300 is present in the network.

As such, the gateway controller 300 may generate dynamic routing table information based on the first and second specific messages (1. request message (or routing message), 2. NM message) received from each destination controller (see FIG. 5).

FIG. 5 is an exemplary diagram for describing the configuration of the dynamic routing table information generated by the gateway controller in FIG. 2. The dynamic routing table may include message ID information requesting or not requesting routing, source count information for the message ID, destination count information for the message ID, and routing execution or non-execution information for the message ID.

When the gateway controller 300 receives the first specific message (for example, request message (or routing message)), the gateway controller 300 may change the source count of the message ID.

For example, when the first specific message (for example, request message (or routing message)) is an add command, the gateway controller 300 may increase the source count of the message ID by 1. In contrast, when the first specific message is a remove command, the gateway controller 300 may decrease the source count of the message ID by 1.

Figure 6:
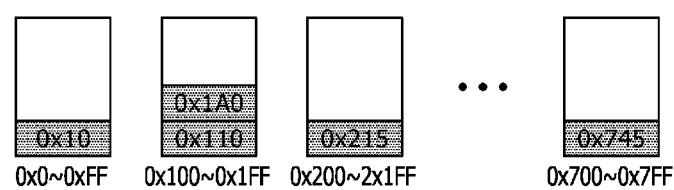
FIG. 6 is an exemplary diagram for message reception filters dynamically changed by a gateway controller in FIG. 2.

When the source count of the message ID is changed from 0 to 1 or changed from 1 to 0, the gateway controller 300 may change the message reception filter for the message ID (see FIG. 6).

That is, when the source count of the message ID is changed from 0 to 1, the gateway controller 300 may change the message reception filter with respect to the message ID so as to perform the routing. In contrast, when the source count of the message ID is changed from 1 to 0, the gateway controller 300 may change the message reception filter with respect to the message ID so as not to perform the routing (see FIG. 6).

In addition, when the second specific message (that is, NM message) is received, the gateway controller 300 may change a destination count.

For example, when the NM message is received through the message reception unit 310, the gateway controller 300 may increase the destination count of the message ID by 1, continuously maintain the destination count, and then decrease the destination count of the message ID corresponding to the destination controller by 1 when the NM message is not received through the message reception unit 310 and thus timeout occurs. When the destination count of the message ID is changed from 1 to 0 through the increase or decrease of the destination count (that is, when the destination controller enters a sleep state), the gateway controller 300 may not perform the routing (that is, message transmission) with respect to the message ID.

FIG. 6 is an exemplary diagram for describing the message reception filters dynamically changed by the gateway controller in FIG. 2. As described above, the gateway controller 300 may receive the first specific message (for example, request message (or routing message)) from the destination controller and dynamically change the message reception filters.

For example, as illustrated in FIG. 6, the gateway controller 300 may change (that is, remove) the message reception filters for the message ID, the source count of which is changed from 1 to 0, based on the first specific message (for example, request message (or routing message) with respect to message reception filters (0×0 to 0×7FF) (that is, eight buffers (arrays) constituted for each message ID region). In contrast, the gateway controller 300 may change (that is, add) the message reception filter for the message ID, the source count of which is changed from 0 to 1.

Therefore, since the gateway controller 300 may determine whether the message transmitted by the source controller is received by confirming the state of the message reception filter 340, the message not required to be routed is not received, thereby reducing the load of software and the load of CAN bus.

Figure 3:
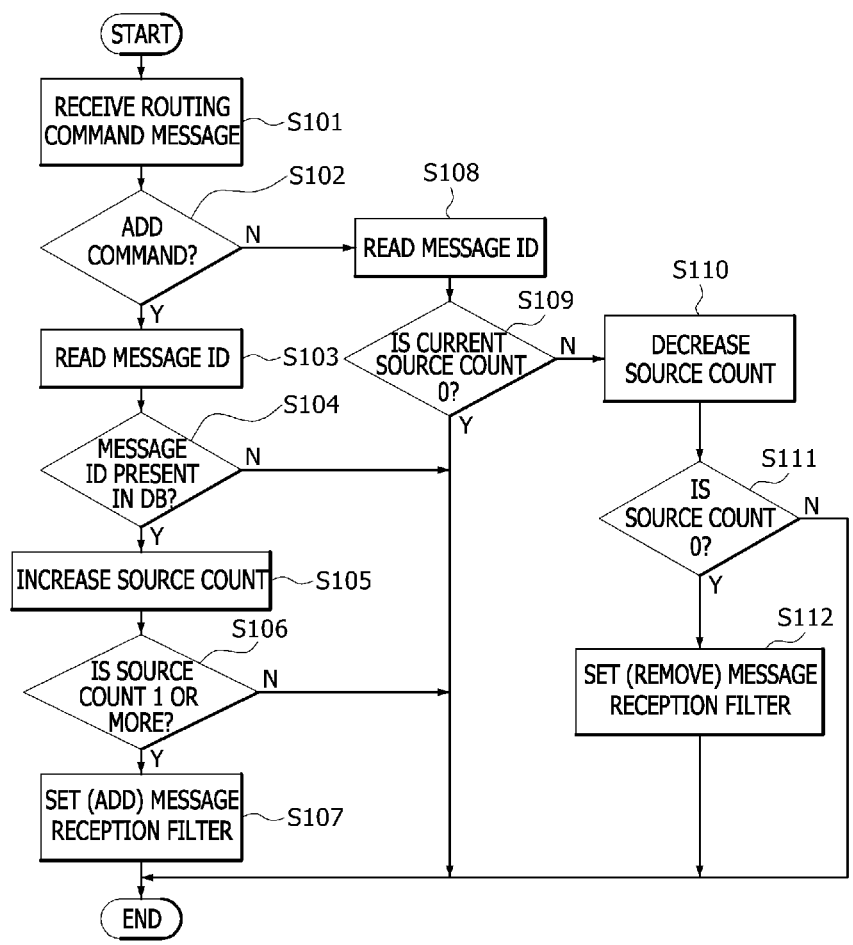
FIG. 3 is a flowchart of a dynamic routing method for a CAN message of a vehicle in accordance with an embodiment of the present invention.

FIG. 3 is a flowchart of a dynamic routing method for a CAN message of a vehicle in accordance with an embodiment of the present invention. As illustrated in FIG. 3, when communication is started, the gateway controller 300 may receive the first specific message (for example, request message (or routing message)) from the destination controller (S101).

The gateway controller 300 may check whether a command included in the first specific message (for example, request message (or routing message)) is an add command (S102).

When it is checked at the step S102 that the command included in the first specific message (for example, request message (or routing message)) is the add command (YES in S102), the gateway controller 300 may read the message ID included in the first specific message (S103).

The gateway controller 300 may check whether the read message ID is the message ID present in the routing database (S104).

When the message ID is present in the routing database (YES in S104), the gateway controller 300 may increase the source count of the message ID of the dynamic routing table by 1 (S105).

The gateway controller 300 may check whether the source count of the message ID of the dynamic routing table is 1 or more (S106).

When it is checked at the step S106 that the source count of the message ID is 1 or more (YES in S106), the gateway controller 300 may set (add) the message reception filter for the message ID (S107).

With respect to only the message ID set (added) to the message reception filter, the gateway controller 300 may checks whether the message is received and perform the routing on the destination controller, thereby reducing the load of software and the load of CAN bus.

Meanwhile, when it is checked at the step S102 that the command included in the first specific message (for example, request message (or routing message)) is not the add command (NO in S102) (that is, the command is the remove command), the gateway controller 300 may read the message ID included in the first specific message (S108).

The gateway controller 300 may check whether the current source count of the message D of the dynamic routing table is 0 (S109).

When it is checked at the step S109 that the source count of the message ID of the dynamic routing table is 0 (YES in S109), the message ID is in a state of being removed in the message reception filter 340, and thus the gateway controller 300 may not perform an additional operation.

When it is checked at the step S109 that the source count of the message ID of the dynamic routing table is not 0 (NO in S109), the gateway controller 300 may decrease the source count of the message ID of the dynamic routing table by 1 (S110).

As a result of decreasing the source count of the message ID by 1, the gateway controller 300 may check whether the source count of the message ID of the dynamic routing table is 0 (S111).

When it is checked at the step S111 that the source count of the message ID is 0 (YES in S111), the gateway controller 300 may set (remove) the message reception filter 340 for the message ID (S112).

Since the message ID is set (removed) to the message reception filter 340, the gateway controller 300 may not confirm whether the message is received with respect to the message ID removed from the message reception filter 340, thereby reducing the load of software and the load of CAN bus.

The present embodiment has an effect that can actively perform the message routing by grasping the state change of the source controller and the destination controller based on the dynamic routing table information during the operation of the vehicle. In addition, only when there is the message to be received, the destination controllers can transmit the routing request, and when not necessary, the destination controllers can transmit the routing release request. Therefore, the gateway controller can selectively perform the routing according to the request state of the message, thereby reducing the load of software and the load of CAN bus.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A dynamic routing device for a Controller Area Network (CAN) message of a vehicle, the device comprising:
 a message reception unit configured to receive a message of a specific ID transmitted from a source controller and a designated specific message from at least one destination controller;
 a message reception filter configured to dynamically change based on at least one piece of information included in the specific message; and
 a gateway controller including the message reception unit and the message reception filter, wherein the gateway controller is configured to generate dynamic routing table information based on information about the specific message, check reception of a message with respect to only a message ID set to the message reception filter, and perform message routing on a destination controller designated in the dynamic routing table,
 wherein the gateway controller is configured to dynamically change a setting for message routing according a current state of the destination controller,
 wherein the designated specific message received from the destination controller comprises:
 a first specific message in which the destination controller requests or does not request the gateway controller for routing with respect to the specific ID; and a second specific message periodically transmitted to the gateway controller while the destination controller is in an operating state, and wherein the gateway controller is configured to:
when the second specific message is received, increase a destination count by 1 for each of a plurality of consecutively received second specific messages with respect to the message ID corresponding to the destination controller in the dynamic routing table, and maintain the destination count;

when the second specific message is not received and timeout occurs, decrease the destination count by 1 with respect to the message ID corresponding to the destination controller; and when the destination count of the message ID is changed from 1 to 0 through the decrease of the destination count, not perform routing with respect to the message ID.

2. The dynamic routing device of claim 1, wherein the gateway controller is configured to dynamically change a setting for message routing according to a routing request of the destination controller.

3. The dynamic routing device of claim 1, wherein the first specific message comprises:
a command region for recording an add or remove command;
a message count region for recording a count to be increased or decreased; and
a message ID region for recording a message ID desiring a routing request or a routing non-request.

4. The dynamic routing device of claim 1, wherein the gateway controller is configured to:
determine that the destination controller is in an operating state while the second specific message is periodically received; and
determine that the destination controller enters a sleep state when the second specific message is not received.

5. The dynamic routing device of claim 1, wherein the dynamic routing table comprises:
message ID information requesting or not requesting routing;
source count information about the message ID;
destination count information about the message ID; and
routing execution or non-execution information about the message ID.

6. The dynamic routing device of claim 1, wherein the gateway controller is configured to:
when the first specific message comprises an add command, increase a source count of the message ID by 1 in the dynamic routing table; and
when the first specific message comprises a remove command, decrease the source count of the message ID by 1 in the dynamic routing table.

7. The dynamic routing device of claim 6, wherein the gateway controller is configured to:
when the source count of the message ID is changed from 0 to 1, add the message ID to the message reception filter so that the gateway controller performs routing with respect to the message ID; and
when the source count of the message ID is changed from 1 to 0, remove the message ID from the message reception filter so that the gateway controller does not perform routing with respect to the message ID.

8. The dynamic routing device of claim 1, wherein, when the destination count of the message ID is changed from 1 to 0 through the increase or decrease of the destination count, the gateway controller is configured to determine that the destination controller enters a sleep state and does not perform routing with respect to the destination controller corresponding to the message ID.

9. A dynamic routing method for a Controller Area Network (CAN) message of a vehicle, the method comprising:
receiving, by a gateway controller, a message of a specific ID transmitted from a source controller and a designated specific message including a first specific message from a destination controller;
checking, by the gateway controller, whether a command included in the first specific message is an add command;
when the command included in the first specific message is the add command, reading, by the gateway controller, a message ID included in the first specific message and increasing a source count of the message ID of a dynamic routing table;
checking, by the gateway controller, whether the source count of the message ID of the dynamic routing table is 1 or more;
when the source count of the message ID is 1 or more, adding, by the gateway controller, the message ID to a message reception filter; and
checking, by the gateway controller, whether a message is received with respect to only the message ID added to the message reception filter and performing routing on the destination controller,
wherein the gateway controller is configured to dynamically change a setting for message routing according a current state of the destination controller,
wherein the designated specific message received from the destination controller comprises:
the first specific message in which the destination controller requests or does not request the gateway controller for routing with respect to the specific ID; and
a second specific message periodically transmitted to the gateway controller while the destination controller is in an operating state, and
wherein the gateway controller is configured to:
when the second specific message is received, increase a destination count by 1 for each of a plurality of consecutively received second specific messages with respect to the message ID corresponding to the destination controller in the dynamic routing table, and maintain the destination count;
when the second specific message is not received and timeout occurs, decrease the destination count by 1 with respect to the message ID corresponding to the destination controller; and
when the destination count of the message ID is changed from 1 to 0 through the decrease of the destination count, not perform routing with respect to the message ID.

10. The dynamic routing method of claim 9, wherein, when the source count of the message ID of the dynamic routing table is increased,
the dynamic routing method further comprises checking, by the gateway controller, whether the message ID is a message ID present in a routing database after reading the message ID included in the first specific message, and
when the message ID is present in the routing database, the source count of the message ID of the dynamic routing table is increased by 1.

11. The dynamic routing method of claim 9, wherein the dynamic routing table comprises:

message ID information requesting or not requesting routing;
source count information about the message ID;
destination count information about the message ID; and
routing execution or non-execution information about the message ID.

12. The dynamic routing method of claim 9, wherein the first specific message is a message including information in which the destination controller requests or does not request the gateway controller for routing with respect to the specific ID, and
the first specific message comprises:
a command region for recording an add or remove command;
a message count region for recording a count to be increased or decreased; and
a message ID region for recording a message ID desiring a routing request or a routing non-request.

13. A dynamic routing method for a Controller Area Network (CAN) message of a vehicle, the method comprising:
receiving, by a gateway controller, a message of a specific ID transmitted from a source controller and a designated specific message including a first specific message from a destination controller;
checking, by the gateway controller, whether a command included in the first specific message is a remove command;
when the command included in the first specific message is the remove command, reading, by the gateway controller, a message ID included in the first specific message, and decreasing a source count of the message ID of a dynamic routing table when the source count of the message ID of the dynamic routing table is not 0;
removing, by the gateway controller, the message ID from a message reception filter when the source count of the message ID of the dynamic routing table is 0 as a result of decreasing the source count of the message ID by 1; and
checking, by the gateway controller, whether a message is received from a source controller with respect to only the message ID removed from the message reception filter,
wherein the gateway controller is configured to dynamically change a setting for message routing according a current state of the destination controller,
wherein the designated specific message received from the destination controller comprises:
the first specific message in which the destination controller requests or does not request the gateway controller for routing with respect to the specific ID; and
a second specific message periodically transmitted to the gateway controller while the destination controller is in an operating state, and
wherein the gateway controller is configured to:
when the second specific message is received, increase a destination count by 1 for each of a plurality of consecutively received second specific messages with respect to the message ID corresponding to the destination controller in the dynamic routing table, and maintain the destination count;
when the second specific message is not received and timeout occurs, decrease the destination count by 1 with respect to the message ID corresponding to the destination controller; and
when the destination count of the message ID is changed from 1 to 0 through the decrease of the destination count, not perform routing with respect to the message ID.

14. The dynamic routing method of claim 13, wherein the dynamic routing table comprises:
message ID information requesting or not requesting routing;
source count information about the message ID;
destination count information about the message ID; and
routing execution or non-execution information about the message ID.

15. The dynamic routing method of claim 13, wherein the first specific message is a message including information in which the destination controller requests or does not request the gateway controller for routing with respect to the specific ID, and
the first specific message comprises:
a command region for recording an add or remove command;
a message count region for recording a count to be increased or decreased; and
a message ID region for recording a message ID desiring a routing request or a routing non-request.

* * * * *